(12) United States Patent
Takeuchi

(10) Patent No.: US 6,580,251 B2
(45) Date of Patent: Jun. 17, 2003

(54) POWER CHARGING DEVICE USING MULTIPLE ENERGY SOURCES

(75) Inventor: Kesatoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/125,559

(22) Filed: Apr. 19, 2002

(65) Prior Publication Data
US 2003/0002305 A1 Jan. 2, 2003

(30) Foreign Application Priority Data
Apr. 20, 2001 (JP) ........................... 2001-123413

(51) Int. Cl.[7] ................................. H01M 12/216
(52) U.S. Cl. ........................................ 320/138
(58) Field of Search ........................ 320/116, 117, 320/123, 128, 137, 138

(56) References Cited

U.S. PATENT DOCUMENTS

| 4,581,570 A | * | 4/1986 | Mejia |
| 5,422,558 A | * | 6/1995 | Stewart |
| 6,088,250 A | * | 7/2000 | Siri |

* cited by examiner

Primary Examiner—Edward H. Tso
(74) Attorney, Agent, or Firm—Nixon Peabody LLP; Thomas W. Cole

(57) ABSTRACT

A power charging device is provided in which different power sources 12 are used, and if the generating capacity of each of the power sources varies without correlation, the voltage thereof is constantly controlled to be a voltage determined by a charging unit 48, whereby the charging unit 48 can receive uniform voltages. Also, the uniform voltage value is determined based on the difference between the present charging state and the full-charge. Accordingly, charging with an overcurrent and charging beyond capacity can be prevented, thus realizing steady charging.

6 Claims, 6 Drawing Sheets

POWER CHARGING DEVICE USING MULTIPLE ENERGY SOURCES

BACKGROUND OF THE INVENTION

1. Field of the Invention

The present invention relates to a power charging device using multiple energy sources for supplying a predetermined amount of electrical power, wherein the multiple energy sources comprise a plurality of power sources, each having a different generating capacity and each output value thereof varying independently.

2. Description of the Related Art

Hitherto, various power sources, for example, dynamic energy, are used for power generation. For example, wind power generation is literally a power generation method using wind power and examples of windmills used for efficient generation include a propeller-type, a Darius-type, and a paddle-type. Also, thermal power generation and nuclear power generation have become the mainstreams of large-scale power generation. On the other hand, in a solar battery, light energy is directly converted into electrical energy for use. Although the utilization range of solar batteries is small, they are commonly used as power sources in electronic calculators and so forth.

In any case, a power source generating dynamic energy is required for performing charging. Generally, a single type of power source is used as the power source. That is, in wind power generation, a power source generated only by wind power is provided so as to obtain a large amount of power in a short period of time. This is the same for hydraulic power generation and thermal power generation. In this way, in a known charging system, charging is performed based on the power source from which uniform electrical power can be obtained, and thus a charging part needs to have only a charging function.

SUMMARY OF THE INVENTION

However, when different types (natures) of power sources are used, individual power sources often generate different amounts of electrical power. Therefore, the charging part needs to set a suitable output for each power source.

Further, since the plurality of power sources often vary without correlation, the charging system cannot perform efficient charging of a desired amount of electrical power. Accordingly, under the present circumstances, a separate charging function must be provided for each power source, thus causing complexity of device configuration and management, and a low utility value.

The present invention has been made in view of the above-described background, and it is an object of the present invention to provide a power charging device using multiple energy sources, in which a plurality of types of power source, each varying without correlation, are managed together so as to reduce complexity in charging system management, and in which efficient charging can be achieved using power output from the plurality of power sources with a single charging function, thereby simplifying the configuration of the device.

The present invention provides a power charging device using multiple energy sources for supplying a predetermined amount of electrical power, wherein the multiple energy sources comprise a plurality of power sources, each having a different generating capacity and each output value thereof varying independently. The device comprises output changing means which is provided for each of the power sources and which changes the variable output value to a desired output voltage value, and charging means which outputs the desired output voltage value to the output changing means and which supplies the power from the plurality of connected power sources.

According to the present invention, an input (voltage, for example) to the charging means can be made uniform by providing the output changing means, which changes the variable output value to the desired output value, for each of the power sources.

Further, in the present invention, the output changing means comprises a rectifier for rectifying an AC voltage of each of the power sources and an inverter which converts a DC voltage generated by rectification by the rectifier to frequency-adjustable AC and which converts the AC after the frequency adjustment to DC.

Most power sources generate AC. That is, the charging principle is basically the opposite to the principle of a motor which drives by changing polarities alternately, and thus the output voltage is AC. The AC is rectified by the rectifier so as to generate a DC voltage.

By converting the DC voltage to frequency-adjustable AC, the output voltage can be freely changed by frequency adjustment. By converting the adjusted AC to DC, the output voltage of each of the plurality of power sources, which have different output voltages, can be made uniform. The inverter functions to change DC to AC, and then to change AC to DC.

Also, in the present invention, the power charging device further comprises bias voltage supplying means for supplying a bias voltage to the inverter.

Since the inverter does not function when the input value is 0, a constant voltage must be supplied to the inverter even when the input from the power sources is 0. By supplying a predetermined voltage in advance from the bias voltage supplying means to the inverter, the inverter functions properly.

In the present invention, the inverter receives the desired output voltage value from the charging means and frequency adjustment is performed based on the desired output voltage value.

By the frequency adjustment in the inverter based on the desired output voltage value from the charging unit, the output voltage (effective value) of each of the plurality of power sources can be controlled so as to be uniform.

Further, in the present invention, the charging means comprises a maximum-current detector for detecting a maximum current value based on the electrical power supplied from the plurality of power sources, and a voltage feedback unit for converting the current value detected by the maximum-current detector to a voltage value and sending the voltage value to the inverter.

Each current value varies in accordance with the adjusted voltage by making the output voltage of each of the plurality of power sources uniform. Also, the time for a full charge cannot be estimated because the capacity of each power source varies. Accordingly, in a process where charging is gradually performed, the charging means adequately sets the output voltage of each power source based on the change in the charging voltage and the full-charge voltage.

Also, in the present invention, each of the maximum-current detector and the voltage feedback unit includes a phase-locked loop (PLL) circuit.

By using the PLL circuit, the difference between the charging voltage and the full-charge voltage which continuously changes can be recognized in real time, and the circuit configuration can be simplified.

DESCRIPTION OF THE PREFERRED EMBODIMENTS

Figure 1:
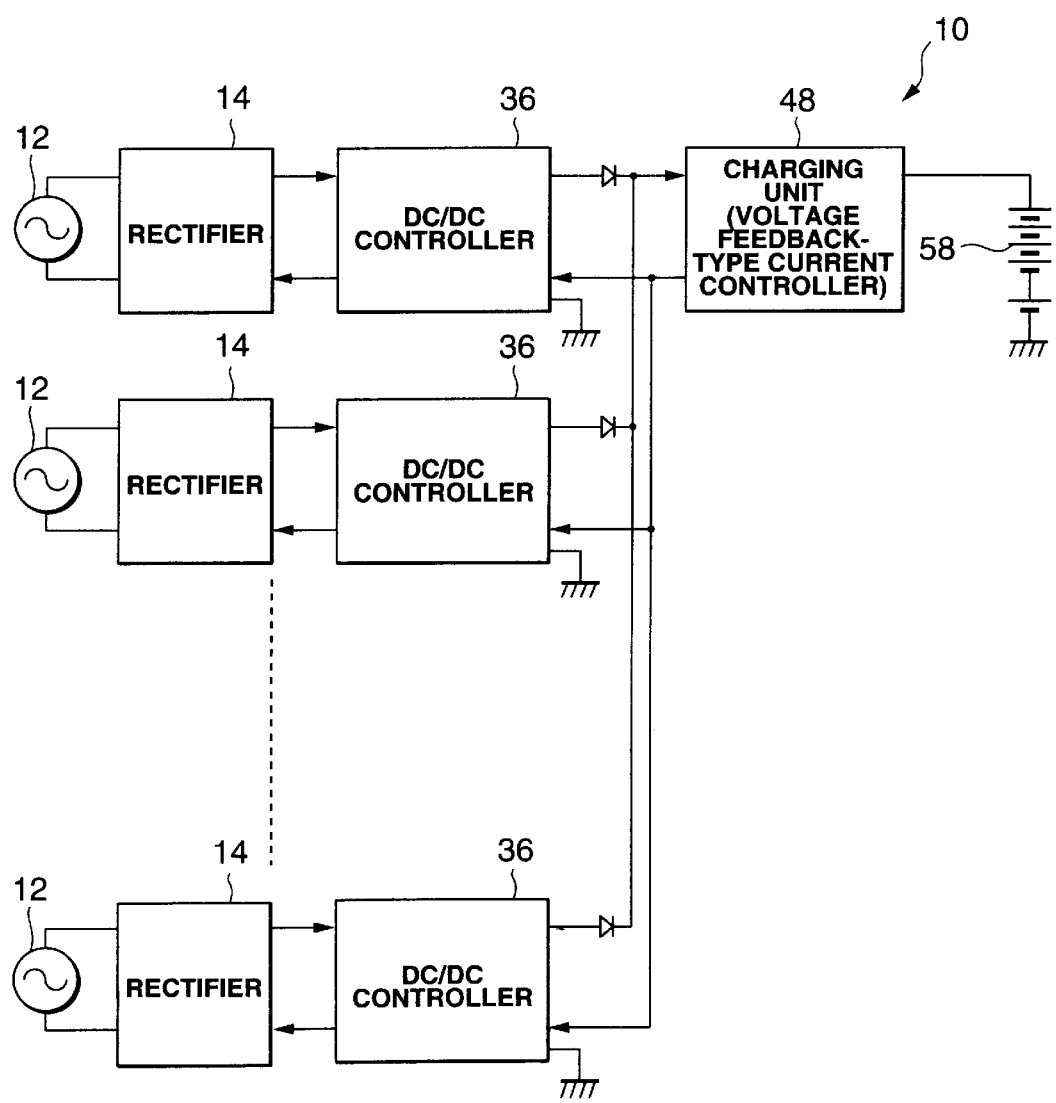
FIG. 1 is a schematic diagram showing the configuration of a power charging device 10 according to the present invention.

FIG. 1 is a schematic diagram showing the configuration of a power charging device 10 according to an embodiment. In FIG. 1, a plurality of power sources 12 are provided, each generating an AC voltage. The generating capacity varies in each of the power sources 12. That is, in wind power generation, the output voltage changes depending on the wind power, and in thermal power generation, the output voltage may change depending on the thermal power. Furthermore, when power is generated by human-powered rotation of a rotor, the generating capacity strongly varies and sometimes no power is generated.

A rectifier 14 is connected to each of the power sources 12. The rectifier 14 converts the AC voltage to a DC voltage.

Rectifier

Figure 2:
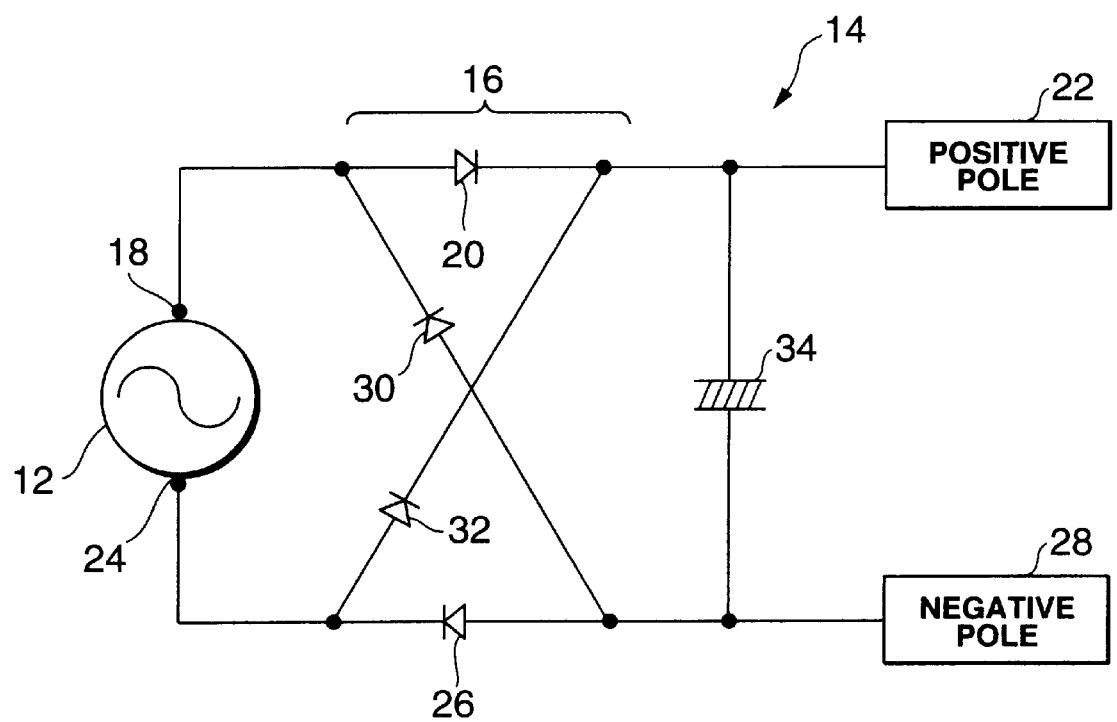
FIG. 2 shows the circuit configuration of a rectifier.

As shown in FIG. 2, the rectifier 14 includes a so-called bridge circuit 16, and one output terminal 18 of the power source 12 is connected to the anode of a first diode 20. The cathode of the first diode 20 is connected to the terminal of a positive pole 22. Also, the other output terminal 24 of the power source 12, from which an output signal is output, is connected to the cathode of a second diode 26. The anode of the second diode 26 is connected to a negative pole 28.

The cathode of a third diode 30 is connected between the output terminal 18 and the first diode 20 and the anode of the third diode 30 is connected between the second diode 26 and the negative pole 28.

Also, the anode of a fourth diode 32 is connected between the other output terminal 24 and the second diode 26 and the cathode of the fourth diode 32 is connected between the first diode 20 and the positive pole 22. In addition, an electrolytic capacitor 34 bridges the positive pole 22 and the negative pole 28.

With this configuration, the waveform of the voltage becomes bell-shaped, that is, the polarity thereof is positive (the negative part is inverted), due to the first to fourth diodes 20, 26, 30, and 32. The voltage having this waveform is then rectified to a positive voltage having a substantially uniform value by the electrolytic capacitor 34.

The output of the rectifier 14 shown in FIG. 1, that is, the positive pole 22 and the negative pole 28 shown in FIG. 2, are input to a DC/DC controller 36. The DC/DC controller 36 is constituted mainly by a so-called inverter, converts DC to AC, and has a function for converting AC to DC.

DC/DC Controller

Figure 3:
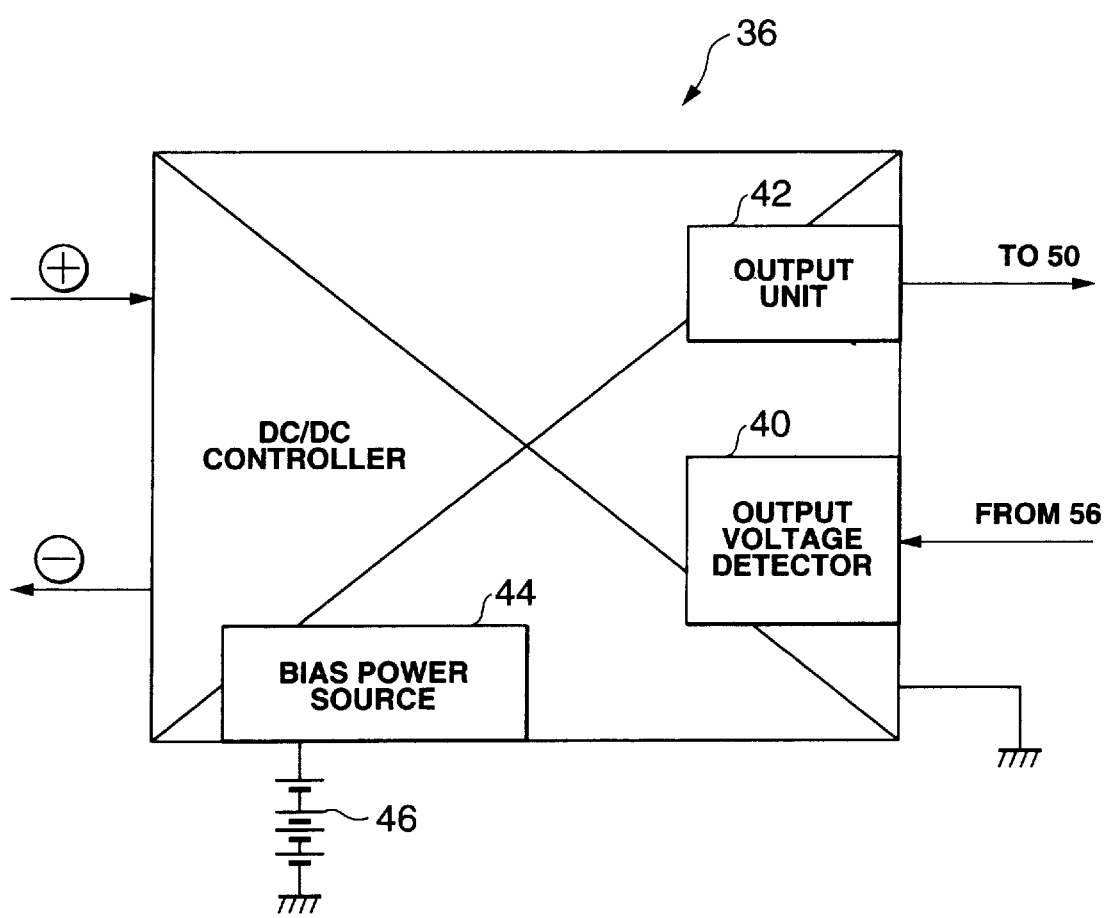
FIG. 3 shows the circuit configuration of a DC/DC controller.

As shown in FIG. 3, the DC/DC controller 36 receives a predetermined DC voltage when the positive pole 22 and the negative pole 28 of the rectifier 14 (see FIG. 2) are connected thereto. An AC voltage is generated based on this DC voltage.

The frequency of the AC voltage is changed based on the voltage detected in an output voltage detector 40. That is, changing the frequency means changing the effective value of the AC voltage, and thus the voltage can be freely changed by the voltage detected in the output voltage detector 40.

The AC whose frequency (voltage) has been changed is again converted to DC, and the DC is output from an output unit 42.

Herein, the inverter, which is the main function of the DC/DC controller, does not function when the input voltage is 0, and thus the DC/DC controller 36 has a bias power source 44. The bias power source 44 receives power from an external power source 46.

As shown in FIG. 1, the output from the output unit 42 is input to a charging unit 48. The output voltage detector 40 receives a predetermined voltage from the charging unit 48.

Charging Unit

Figure 4:
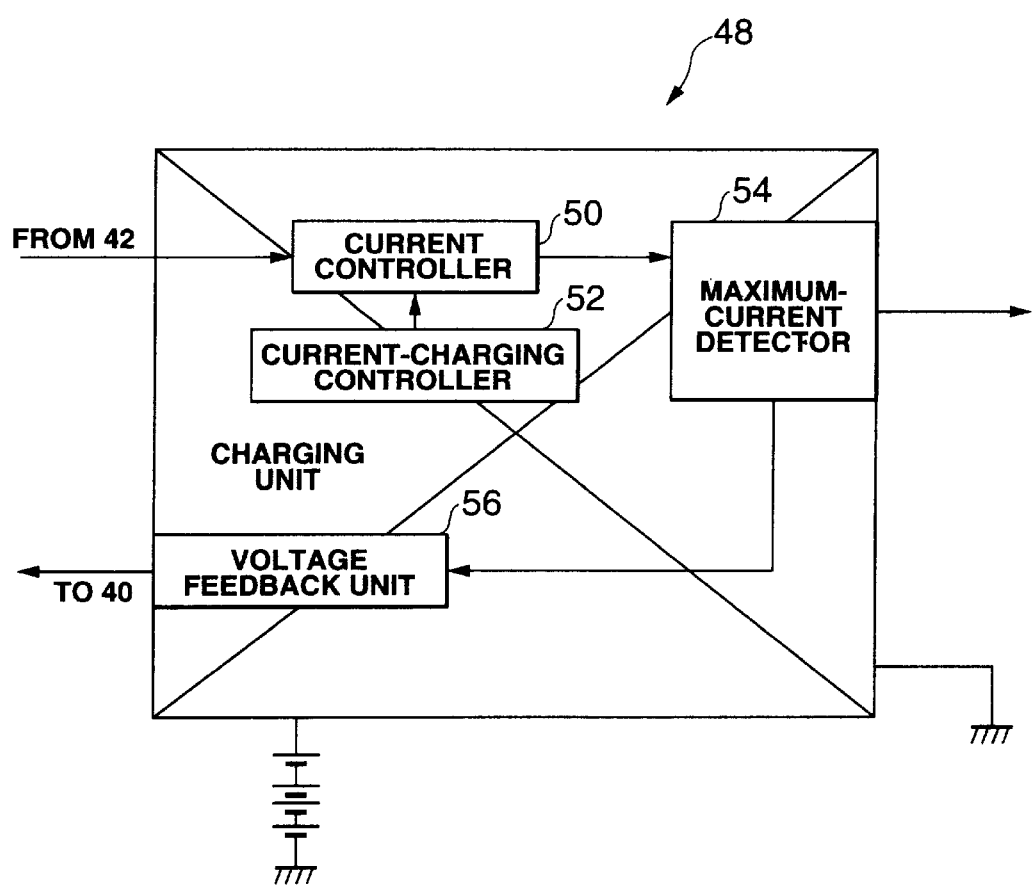
FIG. 4 shows the circuit configuration of a charging unit.

As shown in FIG. 4, the charging unit 48 includes a current controller 50, a current-charging controller 52, a maximum-current detector 54, and a voltage feedback unit 56, as well as ordinary charging functions. A desired voltage value is output from the voltage feedback unit 56 to the output voltage detector 40 of the DC/DC controller 36 (see FIG. 3). The voltage feedback unit 56 performs voltage conversion based on the current detected in the maximum-current detector 54.

The voltage from the voltage feedback unit 56 is a reference voltage for charging using each of the power sources 12. Accordingly, the voltage of each of the power sources 12 can be kept constant even if the generating capacity of each of the power sources 12 varies.

Incidentally, when the voltage is constant, the current value varies in accordance with the generating capacity. When the current value varies, the amount of electric power varies even if the voltage is constant, and thus the charging capacity varies. In other words, an overcurrent may be caused and the time for a full charge cannot be estimated.

Accordingly, the maximum-current detector 54 sets the optimum voltage in order to prevent overcurrent based on the difference between the full-charge voltage and present charging voltage.

Further, the voltage output from the output unit 42 of the DC/DC controller 36 (see FIG. 3) is input to the current controller 50. The current controller 50 is controlled by the current-charging controller 52 and calculates the current value based on the input voltage. The calculation result is sent to the maximum-current detector 54. The maximum-current detector 54 charges a charge medium 58 and outputs the voltage value based on the calculated current to the voltage feedback unit 56 as described above.

Configuration of the Maximum-Current Detector 54 and the Voltage Feedback Unit 56

Figure 5:
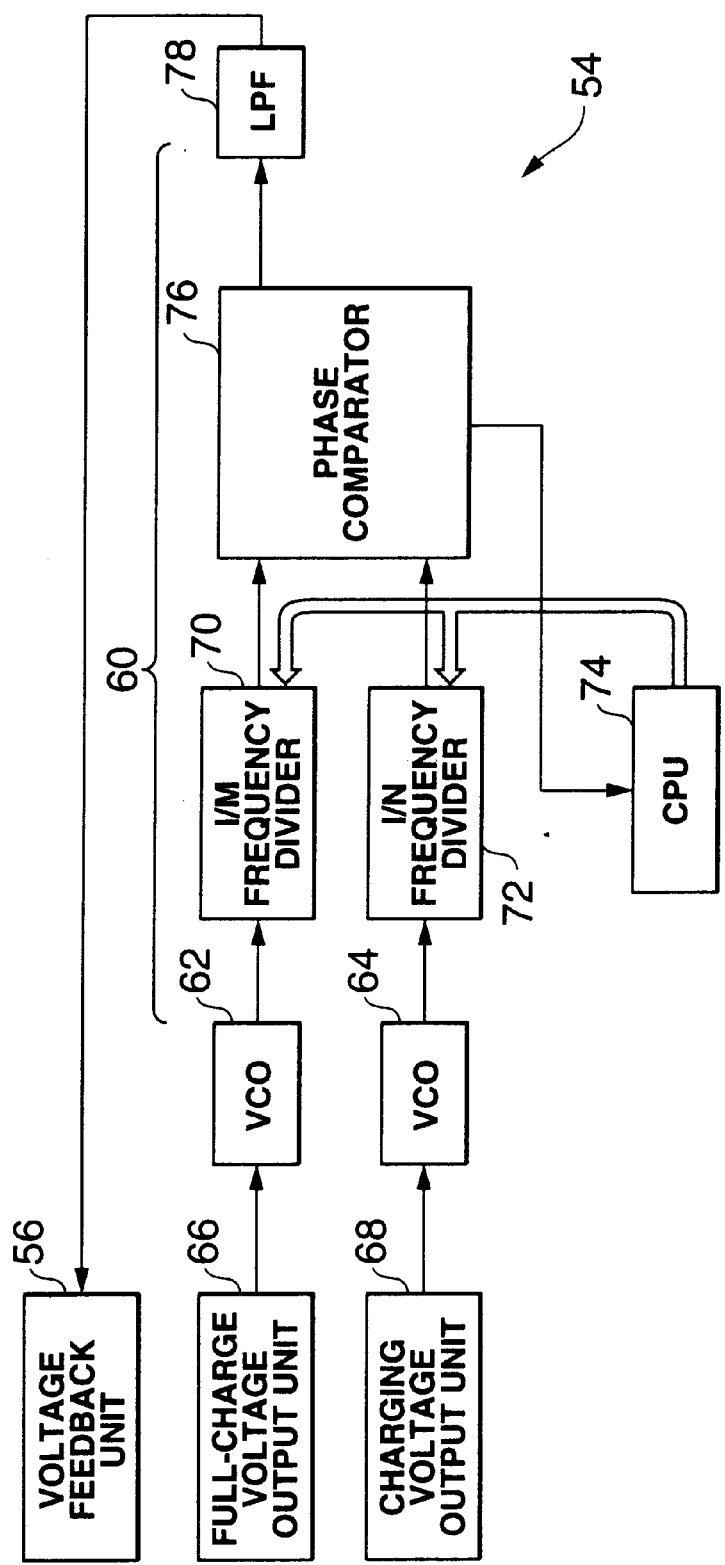
FIG. 5 shows the circuit configuration of a maximum-current detector.

As shown in FIG. 5, the maximum-current detector 54 mainly includes a phase-locked loop (PLL) circuit 60. In the maximum-current detector 54, the PLL circuit 60 includes two voltage-controlled oscillators (VCO) 62 and 64, to which a full-charge voltage output unit 66 and a charging voltage output unit 68 are connected respectively.

The VCO 62, to which the full-charge voltage output unit 66 is connected, is connected to a 1/M frequency divider 70 and the VCO 64, to which the charging voltage output unit 68 is connected, is connected to a 1/N frequency divider 72. The values M and N for defining the division factors of the two frequency dividers (1/M frequency divider 70 and 1/N frequency divider 72) are determined based on a signal from a CPU 74.

The individual signals frequency-divided in the 1/M frequency divider 70 and the 1/N frequency divider 72 are compared by a phase comparator 76 and the comparison result is fed back to the DC/DC controller 36 provided for each of the power sources 12 by the voltage feedback unit 56 via a low-pass filter (LPF) 78. As a result, the output voltage from the charging voltage output unit 68 gradually changes so as to get closer to the full-charge voltage. On the other hand, a phase clock signal is output from the phase comparator 76 to the CPU 74. The CPU 74 changes the division factors M and N for outputting to the 1/M frequency divider 70 and the 1/N frequency divider 72 respectively for phase conformity, and thus a voltage value suitable for the capacity of each of the power sources 12 can be set.

Hereinafter, the operation of the embodiment is described.

When each of the power sources 12 generates power (AC), AC is converted to DC in the rectifier 14 connected to each of the power sources 12. The DC-converted voltage is sent to the DC/DC controller 36. In the DC/DC controller 36, the voltage is converted to AC by the inverter function and the frequency of the AC voltage is adjusted in accordance with a desired voltage from the charging unit 48. This adjustment of the frequency changes the effective voltage value and AC whose frequency is changed is converted again to DC and sent to the charging unit 48.

Herein, the DC/DC controller 36 connected to each of the power sources 12 is controlled by a uniform voltage value from the charging unit 48. Therefore, the charging unit 48 can receive uniform voltages even if the individual voltages input to the DC/DC controllers 36 have different voltage values.

In the charging unit 48, the current value is calculated based on the input voltage. In other words, each current value is changed when the voltage is converted to a predetermined voltage. If the current value changes, the charging capacity varies, and thus the time for a full-charge cannot be estimated.

The maximum-current detector 54 sets the optimum voltage to prevent an overcurrent based on the difference between the full-charge voltage and the present charging voltage, so that a predetermined voltage is output to the DC/DC controller 36 by the voltage feedback unit 56. Accordingly, steady charging is realized from the start until full charge and the time for a full charge can be estimated to some extent.

In this embodiment, the maximum-current detector 54 includes the PLL circuit 60.

The voltage value from the full-charge voltage output unit 66 is sent to the VCO 62, is frequency-divided by the I/M frequency divider 70, and is input to the phase comparator 76. On the other hand, the voltage value from the charging voltage output unit 68 is sent to the VCO 64, is frequency-divided by the 1/N frequency divider 72, and is input to the phase comparator 76.

In the phase comparator 76, the signals which have been frequency-divided in the 1/M frequency divider 70 and the 1/N frequency divider 72 respectively are compared.

As a result, the difference between the full-charge voltage and the present charging voltage appears as a phase difference, and thus an output voltage for eliminating this phase difference is output. This output voltage is fed back to the DC/DC controller 36 provided for each of the power sources 12 by the voltage feedback unit 56 via the LPF. Accordingly, charging can be conducted while the voltage of each of the power sources 12 is constantly controlled.

Incidentally, the values M and N for defining the division factors of the two frequency dividers (1/M frequency divider 70 and 1/N frequency divider 72) are determined based on the signal from the CPU 74.

The phase clock signal from the phase comparator 76 is input to the CPU 74. The CPU 74 changes the division factors M and N for outputting to the 1/M frequency divider 70 and the 1/N frequency divider 72 for phase conformity, and thus a voltage value suitable for the capacity of each power source 12 can be set.

Tables 1 and 2 show a calculation example of the power for charging in the charging unit 48.

TABLE 1

| Power | Time | | | | | |
|---|---|---|---|---|---|---|
| (VA) | 0 | 1 | 2 | 3 | 4 | 5 |
| Power A | 0 | 10 | 15 | 20 | 15 | 5 |
| Power B | 0 | 20 | 10 | 5 | 0 | 0 |
| Power C | 0 | 5 | 15 | 25 | 30 | 15 |
| Total | 0 | 35 | 40 | 50 | 45 | 20 |

TABLE 2

| Charging voltage (V) | 10 | 11 | 12 | 13 | 14 | 15 |
|---|---|---|---|---|---|---|
| Power current A (A) | 0.00 | 0.91 | 1.25 | 1.54 | 1.07 | 0.33 |
| Power current B (A) | 0.00 | 1.82 | 0.83 | 0.38 | 0.00 | 0.00 |
| Power current C (A) | 0.00 | 0.45 | 1.25 | 1.92 | 2.14 | 1.00 |
| Total | 0.00 | 3.27 | 3.50 | 4.08 | 3.50 | 1.67 |

In an example from Tables 1 and 2, when a power of 35 VA is to be obtained in one hour, a power current A of 0.91 A, a power current B of 1.82 A, and a power current C of 0.45 A flow by setting the full-charge voltage to 11 V. In this case, by controlling each power current by the same voltage, the power can be obtained by simply adding the current values.

As described above, in the power charging device 10 according to the embodiment, different power sources 12 are used. If the generating capacity of these power sources 12 varies without correlation, the voltages thereof are constantly controlled to be a predetermined voltage by the charging unit 48. Therefore, the voltages are sent to the charging unit 48, having uniform values.

In addition, the uniform voltage value is determined based on the difference between the present charging voltage and the full-charge voltage. Accordingly, charging with an overcurrent and charging beyond capacity can be prevented, thus realizing steady charging.

In this embodiment, the DC/DC controller 36 has the external power source 46 as the power for the bias power source 44. However, the power may be supplied internally (the output voltage detector 40), as shown in FIG. 6.

As described above, in the present invention, a plurality of types of power source, in which each generating capacity varies without correlation, can be managed together so that management complexity can be reduced. Accordingly, the present invention is advantageous in that the configuration of the device can be simplified by realizing efficient charging using the power output from the plurality of power sources with a single charging function.

Figure 6:
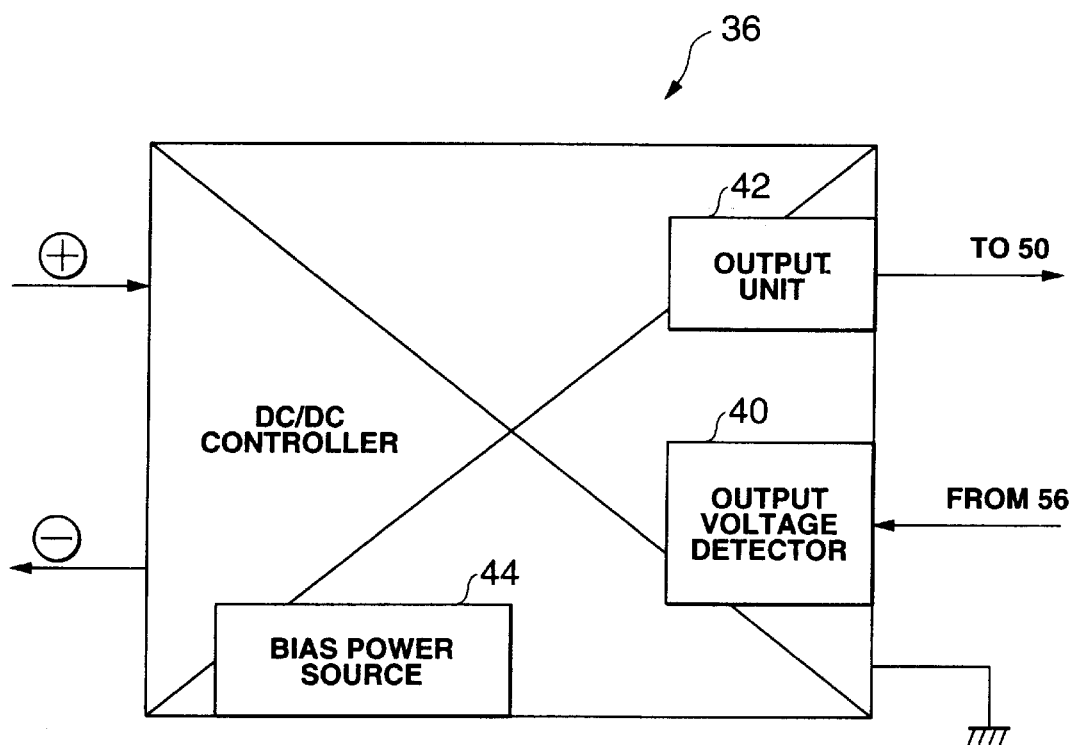
FIG. 6 shows the circuit configuration of a DC/DC controller according to another embodiment.

FIG. 1
14 Rectifier
36 DC/DC Controller
48 Charging Unit (Voltage-Feedback-Type Current Controller)
FIG. 2
22 Positive pole
28 Negative pole
FIG. 3
40 Output voltage detector
42 Output unit
44 Bias power source
DC/DC 制御部 DC/DC Controller
50 へ to 50
56 から from 56
FIG. 4
50 Current Controller
52 Current-Charging Controller
54 Maximum-Current Detector
56 Voltage Feedback Unit
42 から from 42
40 へ to 40
充電部 Charging Unit
FIG. 5
56 Voltage Feedback Unit
66 Full-Charge Voltage Output Unit
68 Charging Voltage Output Unit
70 I/M Frequency Divider
72 I/N Frequency Divider
76 Phase Comparator
FIG. 6
40 Output Voltage Detector
42 Output Unit
44 Bias Power Source
50 へ to 50
56 から from 56
DC/DC 制御部 DC/DC Controller

What is claimed is:

1. A power charging device using multiple energy sources for supplying a predetermined amount of electrical power, wherein the multiple energy sources comprise a plurality of power sources, each having a different generating capacity and each output value thereof varying independently, the device comprising:

output changing means which is provided for each of the power sources and which changes the variable output value to a desired output value; and charging means which outputs the desired output voltage value to the output changing means and which supplies the power from the plurality of connected power sources.

2. The power charging device according to claim 1, wherein the output changing means comprises:

a rectifier for rectifying an AC voltage of each of the power sources; and an inverter which converts a DC voltage generated by rectification by the rectifier to frequency-adjustable AC and which converts the AC after the frequency adjustment to DC.

3. The power charging device according to claim 2, further comprising bias voltage supplying means for supplying a bias voltage to the inverter.

4. The power charging device according to claim 2, wherein the inverter receives the desired output voltage value from the charging means and frequency adjustment is performed based on the desired output voltage value.

5. The power charging device according to claim 2, wherein the charging means comprises:

a maximum-current detector for detecting a maximum current value based on the electrical power, supplied from the plurality of power sources; and a voltage feedback unit for converting the current value detected by the maximum-current detector to a voltage value and sending the voltage value to the inverter.

6. The power charging device according to claim 5, wherein each of the maximum-current detector and the voltage feedback unit includes a phase-locked loop (PLL) circuit.

* * * * *

UNITED STATES PATENT AND TRADEMARK OFFICE
CERTIFICATE OF CORRECTION

PATENT NO.    : 6,580,251 B2
DATED         : June 17, 2003
INVENTOR(S)   : Kesatoshi Takeuchi It is certified that error appears in the above-identified patent and that said Letters Patent is hereby corrected as shown below:

Column 8,
Lines 29 and 31, delete "voltage".

Signed and Sealed this

Twenty-first Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,580,251 B2
DATED : June 17, 2003
INVENTOR(S) : Kesatoshi Takeuchi It is certified that error appears in the above-identified patent and that said Letters Patent is hereby corrected as shown below:

Column 8,
Lines 12, 29 and 31, delete "voltage"

Signed and Sealed this

Twenty-eighth Day of October, 2003

JAMES E. ROGAN
*Director of the United States Patent and Trademark Office*